US009539499B2

(12) United States Patent
Brown

(10) Patent No.: US 9,539,499 B2
(45) Date of Patent: Jan. 10, 2017

(54) GAME APPARATUS CARDS MOVE GAME PIECES ALONG PLAYING STATIONS

(71) Applicant: Anthony James Brown, Tallebudgera (AU)

(72) Inventor: Anthony James Brown, Tallebudgera (AU)

(*) Notice: Subject to any disclaimer, the term of this patent is extended or adjusted under 35 U.S.C. 154(b) by 0 days.

(21) Appl. No.: 14/198,086

(22) Filed: Mar. 5, 2014

(65) Prior Publication Data

US 2014/0221068 A1 Aug. 7, 2014

Related U.S. Application Data

(63) Continuation-in-part of application No. 12/530,144, filed as application No. PCT/AU2008/000317 on Mar. 6, 2008, now abandoned.

(51) Int. Cl.
*A63F 9/14* (2006.01)
*A63F 13/90* (2014.01)
*A63F 1/00* (2006.01)
*A63F 13/00* (2014.01)
*A63F 3/00* (2006.01)
*G07F 17/32* (2006.01)
*A63F 1/06* (2006.01)
*A63F 9/24* (2006.01)

(52) U.S. Cl.
CPC ............... *A63F 13/08* (2013.01); *A63F 1/00* (2013.01); *A63F 3/00006* (2013.01); *A63F 3/00157* (2013.01); *A63F 13/005* (2013.01); *G07F 17/32* (2013.01); *G07F 17/322* (2013.01); *A63F 1/067* (2013.01); *A63F 2009/2425* (2013.01); *A63F 2009/2457* (2013.01)

(58) Field of Classification Search
CPC .............. A63F 3/00028; A63F 3/00082; A63F 3/00157; A63F 3/00643; A63F 9/14
USPC ...... 273/243, 248, 249, 274, 298; 463/6, 16, 463/22
See application file for complete search history.

(56) References Cited

U.S. PATENT DOCUMENTS

| 2,022,533 | A |   | 11/1935 | Blank |           |
|-----------|---|---|---------|-------|-----------|
| 2,062,168 | A |   | 11/1936 | Entwistle |       |
| 3,963,243 | A | * | 6/1976  | Contento | ...... 273/246 |
| 4,033,587 | A |   | 7/1977  | Oliver |          |
| 5,054,788 | A | * | 10/1991 | Kirby | ............ A63F 3/0423 |
|           |   |   |         |       | 273/272 |
| 5,230,518 | A | * | 7/1993  | Crowe | ............ A63F 3/0423 |
|           |   |   |         |       | 273/299 |
| 5,398,938 | A |   | 3/1995  | Money |          |
| 5,826,875 | A |   | 10/1998 | Kardel |         |
| 5,853,173 | A | * | 12/1998 | Murphy | ...... 273/246 |
| 6,079,713 | A |   | 6/2000  | Paz |            |
| 6,550,772 | B1|   | 4/2003  | Streeks et al. |  |

(Continued)

FOREIGN PATENT DOCUMENTS

AU 2001100475 A4 11/2001
AU 742836 B2 1/2002

*Primary Examiner* — William Pierce
(74) *Attorney, Agent, or Firm* — Eagar & Martin Pty Ltd

(57) ABSTRACT

A table game apparatus in which a number of players can participate and comprising a display device having an updateable electronic display of a track, a table including a playing surface and an electronic card reader positioned relative to the table and a set of playing cards divided into a number of suits wherein in use said playing cards are drawn sequentially, then read by the electronic card reader to control the display on the display device.

6 Claims, 6 Drawing Sheets

(56) References Cited

U.S. PATENT DOCUMENTS

| | | | | |
|---|---|---|---|---|
| 8,038,153 B2* | 10/2011 | Fleckenstein | | A63F 1/12 |
| | | | | 273/149 R |
| 8,177,628 B2* | 5/2012 | Manning | | G06Q 20/3224 |
| | | | | 273/138.1 |
| 8,758,109 B2* | 6/2014 | Lutnick | | G07F 17/32 |
| | | | | 273/292 |
| 2001/0000118 A1* | 4/2001 | Sines | | A63F 3/00157 |
| | | | | 273/274 |
| 2001/0014619 A1* | 8/2001 | Kusuda | | A63F 9/143 |
| | | | | 463/6 |
| 2003/0062677 A1 | 4/2003 | Streeks et al. | | |
| 2005/0062227 A1* | 3/2005 | Grauzer | | A63F 1/12 |
| | | | | 273/149 R |
| 2006/0022407 A1* | 2/2006 | Jensen | | A63F 3/04 |
| | | | | 273/272 |
| 2007/0057462 A1* | 3/2007 | Fleckenstein | | A63F 1/00 |
| | | | | 273/274 |
| 2007/0057466 A1* | 3/2007 | Soltys | | G07F 17/322 |
| | | | | 273/292 |
| 2008/0187890 A1* | 8/2008 | Podurgiel | | A63F 1/00 |
| | | | | 434/129 |
| 2008/0303217 A1* | 12/2008 | Snow | | A63F 1/02 |
| | | | | 273/303 |
| 2010/0283204 A1* | 11/2010 | Mahon | | A63F 1/18 |
| | | | | 273/292 |
| 2011/0183740 A1* | 7/2011 | Mahon | | A63F 1/18 |
| | | | | 463/16 |

* cited by examiner

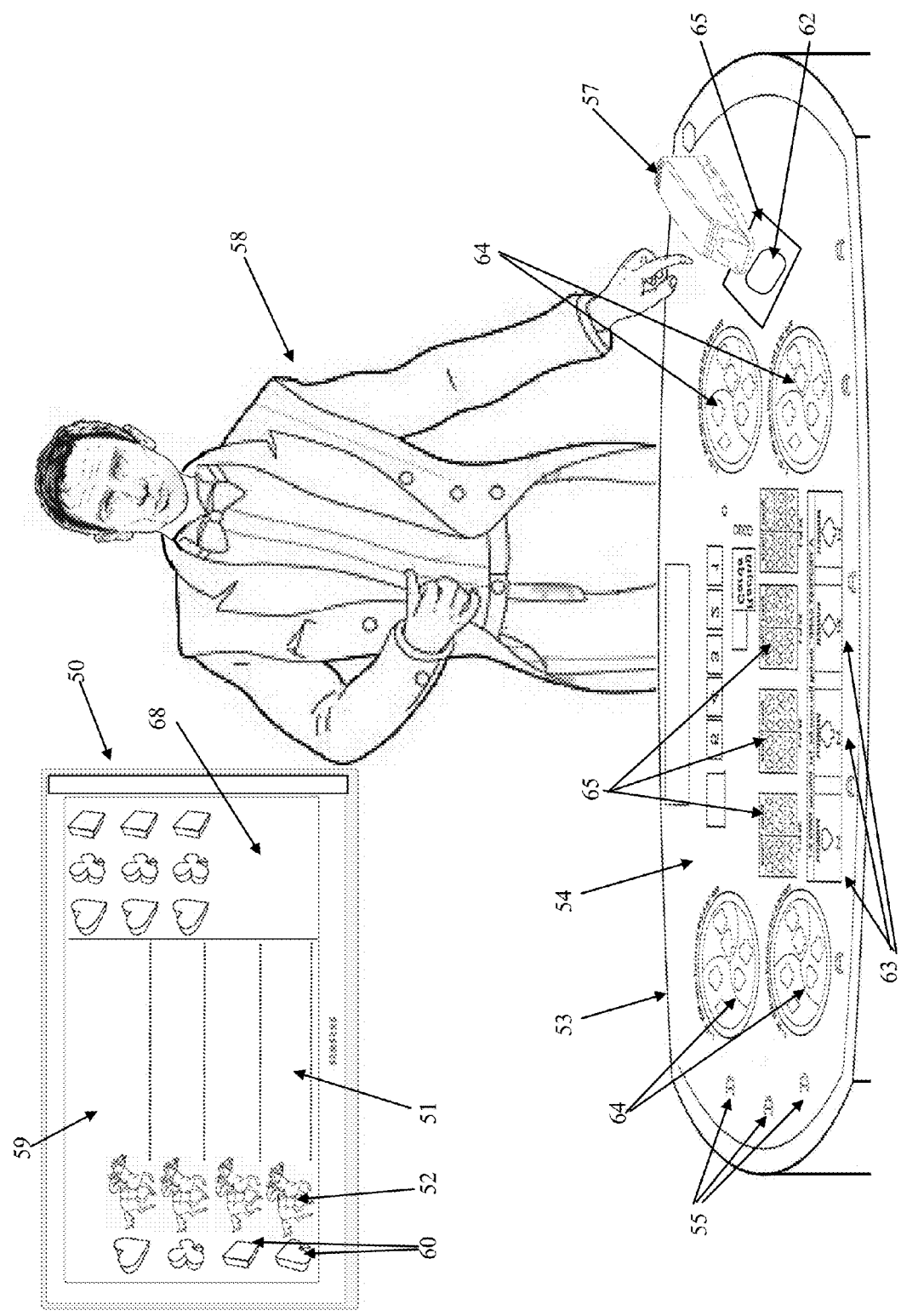

GAME APPARATUS CARDS MOVE GAME PIECES ALONG PLAYING STATIONS

CROSS REFERENCE TO RELATED APPLICATIONS

This application is a continuation-in-part of, and claims the benefit of, U.S. patent application Ser. No. 12/530,144, filed Dec. 29, 2009, which is entitled "Game Apparatus and Method of Play"; and is a continuation of, and claims the benefit of, Australian Patent Application no. 2013273735, filed 19 Dec. 2013, both of which are incorporated herein by reference.

FIELD OF THE INVENTION

This invention relates to game apparatus and also a method for playing a game.

DISCLOSURE OF THE INVENTION

Throughout the specification and claim, unless the context requires otherwise, the word "comprise" or variations such as "comprises" or "comprising", will be understood to imply the inclusion of a stated integer or group of integers but not the exclusion of any other integer or group of integers.

According to one form, the invention resides in a game apparatus for use in a game in which a number of players can participate and comprising a playing surface and a number of playing pieces, the playing surface having a track comprising a number of lanes which are in one to one correspondence with the playing pieces, each playing piece being associated with one of the lanes, each lane comprising an equal number of spaces extending from a start space to a finish space, in use the playing pieces being moveable sequentially along the spaces of the respective lane from the start space to the finish space, said game apparatus further comprising a set of playing tokens divided into said number of subsets which are in one to one correspondence with the number of playing pieces, each playing piece being associated with one of the subsets of playing tokens, the playing surface further comprising a set of stations representing an outcome of the passage of at least one of the playing pieces from the start space to the finish space on the track in accordance with the disposing of a token, said stations associated with reward tokens which in use can be placed on one or more stations by the players, said stations also being representative of a reward available in the event of the designated outcome of the station being achieved, in use said playing tokens being intended to be displayed sequentially and the playing piece associated with the displayed playing token being moved along the track.

According to a preferred feature of the invention, the playing surface includes a number of stations around its perimeter representing the location of a player.

According to a preferred feature of the invention, at least one token of the set of playing tokens comprises a penalty token indicating a penalty to be applied to the rewards available at said stations, against one or more of the players. Typically, the penalty will be applied against tokens on one or more of the reward stations.

According to a further preferred feature of the invention at least one playing token of each subset of tokens comprises a bonus token indicating a bonus to be applied to the rewards available at said stations, to one or more of the players.

According to a preferred feature of the invention the set of playing tokens comprise a set of playing cards in which the suites of the card comprise the subsets.

According to preferred feature of the invention the reward tokens comprise items of currency.

According to preferred feature of the invention the reward tokens comprise items representative of a monetary value of currency.

According to a preferred embodiment of the invention, there will typically be a plurality of reward stations including any number of the following:

1. a set of "Winner" stations on which players may place reward tokens to indicate their wager on the first playing piece to reach the finishing space;
2. a set of "Quinella" stations on which players may place reward tokens to indicate their wager on the first and second playing pieces to reach the finishing space, whether in order or not;
3. a set of "Trifecta" stations on which players may place reward tokens to indicate their wager on the first three playing pieces to reach the finishing space; whether in order or not; and
4. at least one "binary" station on which players may place reward tokens to indicate their wager on an attribute of the subset of the first playing piece to reach the finishing space. Typically this will be a station that indicates a simple "either/or" wager such as Red or Black or Odd or Even.

According to the most preferred embodiment, all of the above described reward stations, are provided.

Other reward stations may be provided to give players options in their gameplay.

The playing surface may include other visually stimulating means such as actuable lights for example which may assist with the identification of winning reward stations.

It is also preferred that the playing pieces provided will be as realistic in appearance and movement as possible as this may enhance the players' experiences. For example, the playing pieces may be animatronic animal pieces actuated from beneath the playing surface and moved along the track in response to the playing tokens displayed as a part of the game.

According to a an alternative form, the invention resides in a game, the game including a playing surface and a number of playing pieces, the playing surface having a track comprising a number of lanes which are in one to one correspondence with the playing pieces, each playing piece being associated with one of the lanes, each lane comprising an equal number of spaces extending from a start space to a finish space, in use the playing pieces being moveable sequentially along the spaced of the respective lane from the start space to the finish space; a set of playing tokens divided into said number of subsets which are in one to one correspondence with the number of playing pieces, each playing piece being associated with one of the subsets of playing tokens; a set of outcome stations representing an outcome of the passage of at least one of the playing pieces from the start space to the finish space on the track in accordance with the disposing of a token, said stations associated with reward tokens which in use can be placed on one or more stations by the players, said stations also being representative of a reward available in the event of the designated outcome of the station being achieved, in use said playing tokens being intended to be displayed sequentially and the playing piece associated with the displayed playing token being moved along the track;

and steps of play including:
  i. each player placing a desired number of reward tokens on at least one outcome station;
  ii. a dealer displaying a playing token and moving the corresponding playing piece at least one space along the track as each playing token is displayed;
  iii. repeating step (ii) until at least one playing piece has reached the respective finished space; and
  iv. rewarding the players based on the wagers placed in step (i).

Typically, step (iii) is undertaken until at least three playing pieces have reached the finishing space.

There may also be a further chance to win apart from those chances outlined previously, namely a "Jackpot" chance. The Jackpot chance is preferably independent of the regular play of the game. A successful jackpot wager will typically be determined according to whether the playing token displayed immediately after the winning playing piece reaches the finished space, is of the same subset as the playing token which moved the winning playing piece to the finished space. If the playing token is of the same subset, then all players with a jackpot wager, are deemed successful. If the playing token is of a different subset, then all players with a jackpot wager are deemed unsuccessful.

The jackpot wager may be placed by each player choosing to place one or more reward tokens relative to their respective player station prior to the start of play in the game.

According to a preferred embodiment, the jackpot is progressive with escalating rewards being allocated if successive playing tokens are of the same subset as the as the playing token which moved the winning playing piece to the finished space. For example, if the first playing token after the playing token which moved the winning playing piece to the finished space, is the of the same subset, then a first reward level is achieved by each player with a jackpot wager. If the first two playing tokens after the playing token which moved the winning playing piece to the finished space, is the of the same subset, then a second, higher reward level is achieved by each player with a jackpot wager.

According to a preferred embodiment, there may be five reward levels of jackpot, each higher than the previous level.

Typically, the playing tokens will be displayed by a independent dealer which will also monitor the wagers placed in the reward stations and pay to or collect from the players accordingly.

The dealer will also preferably actuate the movement of the playing pieces in response to the display of the playing tokens.

According to a preferred embodiment, the reward to players for different stations may be marked or indicated on the playing surface adjacent the respective reward station.

In contrast to other games such as blackjack and its variations, the games played on the apparatus of the present invention can cater for more players to play the game at any one time, the game of the present invention uses fewer cards per game, there is no time wasted waiting for a player to make a decision in relation to gameplay only the wagers made, up to 42 different wagers are possible and the game is easy to learn and play.

In an alternative aspect, the present invention resides in a table game apparatus in which a number of players can participate and comprising:
  a. a display device having an updateable electronic display of a track comprising an image of a number of lanes; and an updateable image of a number of playing pieces which are in one to one correspondence with the number of lanes, each playing piece being associated with one of the lanes and being represented by an image displayed thereon on the updateable electronic display, each lane comprising an equal number of spaces extending from a start space to a finish space;
  b. a table including a playing surface identifying a set of stations marked thereon to representing an outcome of the passage of at least one of the playing pieces from the start space to the finish space on the track in accordance with drawing one or more cards from a set of playing cards, said stations associated with reward tokens which in use can be placed on one or more stations on the table by the players, said stations also being representative of a fixed reward available in the event of the designated outcome of the station being achieved and an electronic card reader positioned relative to the table; and
  c. a set of playing cards divided into said number of subsets which are in one to one correspondence with the number of playing pieces displayed on the updateable electronic display, the number of playing cards in each subset being equal, each playing piece being associated with one of the subsets of playing cards, wherein in use said playing cards are drawn sequentially, then read by the electronic card reader such that the playing piece associated with the suit of each displayed playing card moved sequentially along the track displayed on the updateable electronic display together with an associated audible description of the movement of the playing pieces relative to the spaces in the lanes, the movement and audible description based on the scanning of the playing cards.

In this embodiment, the invention includes a display device which is normally a visual display. The display device will normally be electronic. In a preferred embodiment, the display device will be a television or monitor. The display device will typically have an integrated sound system capable of emitting sound, however a separate sound system which is linked to both the display device and a preferred computer controller may be provided, as well as the integrated sound system or separately therefrom.

Generally, the track is provided and displayed as a simple image of a field divided into a number of lanes, typically four lanes displayed on the display device. Normally there will be an image of a horse provided relative to each of the lanes on the display. The lanes and/or the horses are typically designated according to one of a suit of cards with the number of lanes generally corresponding to the number of suits of cards and one lane being ascribed to each of the suits of cards.

The display is preferably updatable upon instructions issued by a computer controller. As the display is updated, the horse(s), that is, the image of the horse(s) will be moved across the display in a respective lane in order to simulate a horse race taking place dependent upon which cards are drawn.

As mentioned above, typically there will be four spaces provided in each lane not including the start space in the finish space them but there could be more or fewer spaces provided depending upon the decided length of each game in terms of time taken to play the game which can be important to generate or maintain interest.

Preferably, the display device is positioned remotely to the table. Typically, the display device will be positioned at an elevated position kind (on the dealer side) of table, generally facing the table such that the display device can be seen by all of the players at the table.

This embodiment of the present invention includes a table having a playing surface similar to that described above but lacking the track incorporated into the table (the track is preferably displayed remotely on the display).

According to this embodiment of the invention, there will typically be a plurality of reward stations including any number of the following:

a. a set of "Winner" stations on which players may place reward tokens to indicate their wager on the first playing piece to reach the finishing space (normally there will be four of these);

b. a set of "Quinella" stations on which players may place reward tokens to indicate their wager on the first and second playing pieces to reach the finishing space, whether in order or not (normally there will be four groups of these);

c. a set of "Trifecta" stations on which players may place reward tokens to indicate their wager on the first three playing pieces to reach the finishing space; whether in order or not (normally there will be 24 of these); and d. at least one "binary" station on which players may place reward tokens to indicate their wager on an attribute of the subset of the first playing piece to reach the finishing space. Typically this will be a station that indicates a simple "either/or" wager such as Red or Black or Odd or Even.

There will also typically be a first area on the playing surface designated for the dealer to place drawn cards when determining the winner. Typically, this will be a generally rectangular area adjacent the dealer. In addition, there will normally be two separate designated areas provided adjacent the first area, namely a second area for a card or cards drawn to determine the second place winner and a third area for a card or cards are drawn to determine the third place winner. The process undertaken for determining second and third places remains similar to that outlined above, namely once the winner has been decided by one suit being displayed on a drawn playing card a predetermined number of times, the next card dealt from a suit which is different to the winning suit, is declared the second place winner and the next card drawn from a suit which is different to both the winner and the second place winner, is declared third.

According to the present embodiment, each station is individually lit, generally from below the table surface with the surface of the table being at least partially transparent or translucent in order to allow stations to be lit as required.

Normally, one or more lights will be provided to light each station and the lights for each station will typically be individually actuable and controlled by the computer controller. Normally, the lights will be lit at the end of the game to indicate which stations identify successful combinations based on the cards dealt during the game. The lighting of the lights on the stations will normally be controlled by the controller and based on the reading of the cards, without any dealer involvement.

The table of the present invention also includes an electronic card reader positioned relative to the table. Normally, the card reader will be positioned immediately adjacent the card shoe from which the cards are drawn sequentially during the game in order that the cards can be passed over the card reader upon exiting the shoe. Preferably, the card reader will be electronic and normally, the card reader will be linked to the computer controller. The computer controller normally operates pattern recognition software in order to identify at least the suit of each card drawn and preferably both the suit and face value.

Normally the cards are drawn from the shoe facedown and passed over the card reader at a speed to allow recognition of suit the card. Audible feedback (normally a short tone or sound) will preferably be issued in order to indicate to the dealer and/or the players, that the reading of the card and the identification of the suit thereon has been successful.

Normally, a transparent window is provided in the table surface, typically of glass or plastic or the like, and the card reader is positioned beneath the table surface, below the transparent window, out of view directed upwardly to read cards passed over the window. It may be required to provide enhanced lighting in order to allow the suit of the cards to be read.

According to this preferred embodiment, the computer controller will typically receive an image of each card captured using the card reader and then the software resident on the computer controller will process the image in order to detect suit of the card. Once this occurs, the controller preferably instructs the updating of the image on the display to advance the particular horse of the lane corresponding to the suit of the drawn card, by one space, in the lane on the display. At the same time, the computer controller will typically extract at least one audio portion of a "race call" corresponding to that particular suit from data storage associated with the computer controller and then transmit that audio portion to the sound system so that the image update and the issue of the audible description of the update happens more or less contemporaneously. The audible description will normally be broadcast at a sufficient level to allow the players of the game to hear the update as well as to see the horses advance.

The audible portions of the race call will normally be stored in individual sound files in a data storage device associated with the computer controller. The audible portions may be chosen by the computer controller according to relative positions of the "horses" in the "race". This will typically be determined by the computer controller according to the number of cards of each suit that have been drawn in a game.

More than one sound file may be transmitted and played together or in association with one another in order to simulate a race call which normally starts at the leader of the race and works backward through the field in the race, updating the position of each horse in the race, but this can be interrupted if the dealer draws another card at which time, typically the race call will be interrupted and updated when the new card is drawn.

As mentioned above, once a predetermined number of cards of one suit have been drawn, this will correspond to a winner of the race and the computer controller will normally update the image to remove that horse from the display and at the same time, announce the winning suit aurally for example "and Spades is the winner". Thereafter, the next card of a suit which is different to the winning suit is placed in the associated position on the table after has been read and that suit is declared second aurally for example "and Hearts comes in second" with that horse then being removed from the display. Thereafter, the next card of a suit which is different to the winning suit and the suit of the horse placing second is placed in the associated position on the table after has been read and that suit is declared third aurally for example "and Diamonds has run a close third" with that horse then being removed from the display.

Once third place has been decided, the display will typically be reset to show the winner, the second place winner and the third place winner and at the same time, the stations on the table will be lit indicating those particular successful wagers.

Normally, each of the stations will also show the odds or the payouts, on the station, and these odds or payouts will also be present on the reset display showing the winner, second and third place winners. These results will typically be stored.

Historical race results are preferably indicated on a portion of the display in subsequent races allowing the players to see a number of the historical results in order while awaiting game is being played. Normally, the historical results listing will be displayed to one lateral side of the track displayed.

The display is also preferably updated to include a simulated image of each of the cards as they are drawn. This normally occurs at the same time that the image of the race is updated and as the audible description is issued. Therefore, the card reader will also typically be capable of recognising the face value of the card as well as the suit the card. However, the processing of the race will typically occur based on the suit of the card only.

The display will also preferably be updatable to show a simulated view of the stations on the table. The display may be updated throughout the game in order to indicate the particular state of the game at any point, as the cards are drawn.

Once a result has been settled, in that the winner, second place winner and third-place winner have been identified, the dealer will normally award payouts to successful wagers placed on each of the stations and collect unsuccessful wagers. A combination bet may be possible by placing wagers on lines which divide individual stations from one another. This may be provided according to the rules of the game or it may be expressly prevented, for example by providing barriers along each of the divisions between stations.

Once the successful wagers have been paid out and the unsuccessful wagers collected, the dealer will typically reset the game so that it can be played again. As a part of the resetting process, the dealer will normally collect the drawn cards, remove the undrawn cards from the shoe in order to shuffle all of the cards, after which they are then returned to the shoe. The dealer will also reset the display, the lighting of the stations by resetting the game controller to return the game apparatus to start position.

As will be seen from the above, the majority of the functions of the game are controlled by the computer controller. The dealer will simply be required to draw cards from the shoe across the card reader so that they can be recognized, and then place the cards in the required location on the table as well as paying out successful wagers and collecting unsuccessful wagers. The computer controller will normally be located beneath the table and preferably will be integrated with the table. The computer controller will be in communication with the card reader in order to receive the image from the card reader and process the image of each card in order to recognise the card and transmit instructions to the display device, retrieve and transmit the sound files and to update the display and the table when a result has been achieved.

Normally, the resetting of the computer controller will be achieved manually by dealer, normally using a button or switch provided on or in the table surface for this purpose. Generally, the button or switch will be provided in the dealer area of the table on the opposite side of the table to the electronic card reader.

BRIEF DESCRIPTION OF THE DRAWINGS

The description is made with reference to the accompanying drawings in which:

FIG. 3 is a schematic illustration of a table game apparatus according to an embodiment of the invention.

DETAILED DESCRIPTION OF THE SPECIFIC EMBODIMENT

Figure 1:
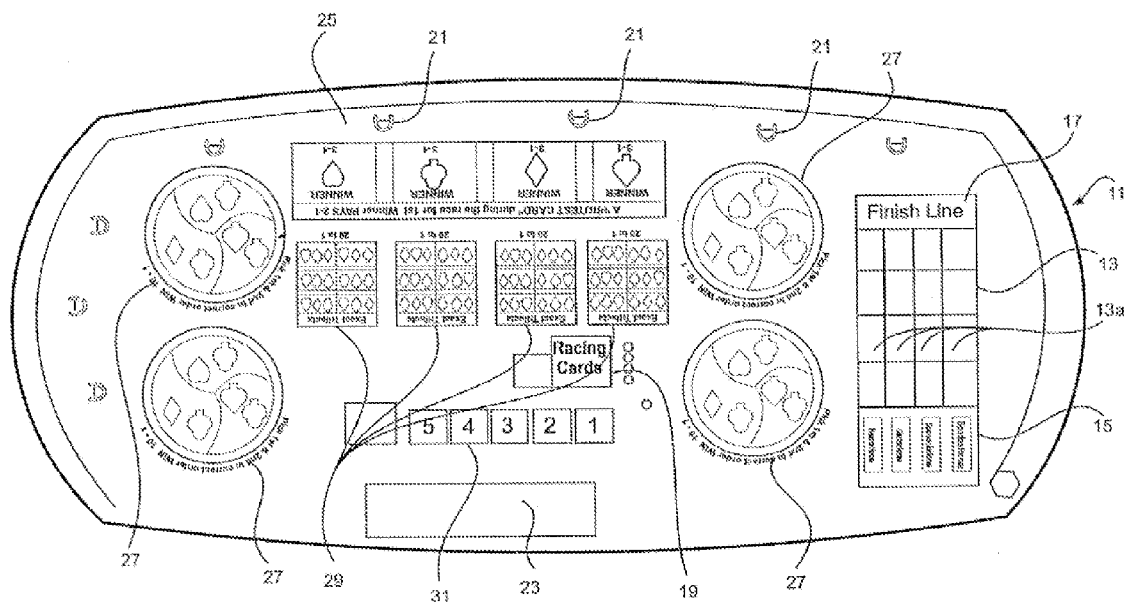
FIG. 1 is a representation of a playing surface according to one embodiment.
Figure 2:
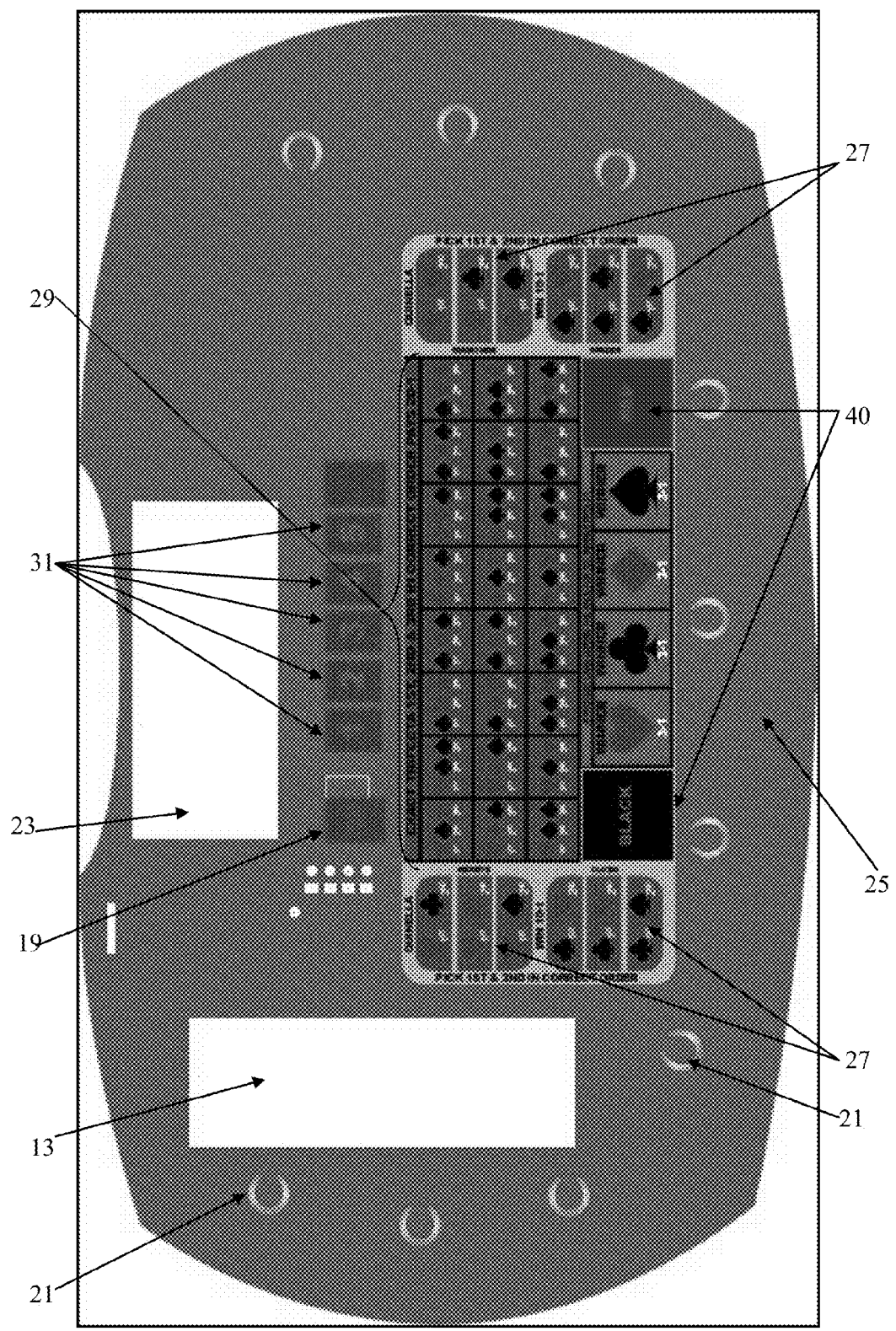
FIG. 2 is a representation of a playing surface according to a second embodiment.

The embodiment is directed to a table game which is meant to replicate a horse race. In which there is a dealer who controls the game a number of players. The game comprises a playing surface 11 of a form as shown in the accompanying drawing. The playing surface includes a track 13 which is sub-divided into four sets of a linear array of sequential spaces 13A which extend between a start position 15 and a finish position 17. The playing surface is associated with a substantially conventional deck of cards (not shown) comprising 52 cards of four different suites comprising hearts, diamonds, clubs and spades. The number of sets of spaces 13A which correspond to the number of suites in the deck and each set of spaces 13a is associated with one of the suites of cards. Each set of spaces 13a is associated with a playing piece (not shown) which has the configuration of a horse and which bears an insignia relevant to the suite to which it belongs.

In addition, the playing surface comprises a first placement zone 19 which is entitled "Racing Cards". In playing the game, cards from a shuffled deck, are sequentially displayed at the location zone 19 with their face exposed. The playing surface further comprises a second placement zone 31 which is located in association with the first placement zone 19 and comprises a set of six zones of which five zones are sequentially numbered 1 to 5 and the final zone is blank.

The playing surface is also provided with a number of playing stations 21 each associated with a horse shoe shaped panel which is illuminated to indicated the presence of a player. Each playing station 21 is associated with a slot which is able to receive a coin of a particular value (e.g. $1). Each slot is provided with an activation means (not shown) which is able to activate suitable circulatory associated with a display (not shown). The display provides an indication of the value of a jackpot which is available to the winner of the game and which comprises the sum of the monetary value which has been deposited by all the participating players in the current game and which has been accumulated by previous games.

The playing surface further includes a tray in which the dealer holds the "chips" held by the dealer.

In addition, the playing surface is provided with a number of sets of stations which are representative of various winning combinations of the game. A first set of stations 25 are representative of a "first past the post" wager. The second set of stations 27 comprise three logos with appropriate representations or divisions to represent a "quinella" wager. The third set of stations 29 which correspond to a "trifecta" wager. A fourth set of wager stations 40 correspond to the binary wager on either red or black being the suit of the winning playing piece.

At the commencement of the game, the playing pieces are located at the start line 15 of the track 13 and each of the players purchase a set of "chips" (not shown) which have a monetary value. The players then place their chips as they desire at the various stations 25, 27 and/or 27 according to their expectation of the result of the game. In addition a player may locate a coin in the respective jackpot slot 21 associated with their station. At the commencement of the game the value of the jackpot is represented by the bets made by each of the players participating and that accumulated from previous games is shown in the display. The deck of cards is then shuffled by the dealer who then takes the cards sequentially from the top of the deck sequentially and places them upon the first location zone 19 with their display face uppermost such that the suite of the cards is exposed. When a card of a particular suite is placed upon the first location zone 19 the respective playing piece is moved one location. This process continues until a playing piece reaches the finish line 17 which decides a winner of the event which provides an outcome of the "first past the post" outcome. From that time onwards further cards are delivered from the deck onto the second location zone such that the first five cards are placed sequentially over the locations number 1, 2, 3, 4 and 5 and all further cards are located on the final second location. The game continues until a playing piece arrives second which will provide a "quinella" outcome. The game continues until a playing piece arrives third which will provide a "trifecta" outcome.

At the conclusion of the game those players having their tokens located on a station relevant to the winning combination (i.e. "first past the post", "quinella" or "trifecta") are rewarded and the remaining chips are claimed by the dealer.

In addition each of the set of cards comprise a first subset which comprise one card which is a protest card. If a protest card is delivered onto the first location 19 prior to a playing piece reaching the finishing line the value of all of the "first past the post" are devalued from 3 to 1 to 2 to 1 and the red/black wager is paid at 50% instead of 1-1.

If no protest card is delivered during the time that a playing piece reaches the finishing line the jackpot may be paid to the player winning subject to the subsequent appearance of one or more bonus cards as described below.

Each suite of the deck of cards is provided with a subset of bonus cards. If after a playing piece has reached the finishing post to win the game a bonus card is delivered onto the second location 31 during the duration of the delivery of next five cards (i.e. on to spaces 1, 2, 3, 4 and 5) until such time as a playing piece becomes the third one to reach the finish the jackpot becomes payable. The magnitude of the jackpot is dependant upon a bonus card being dealt and placed at space 1 and conforming with the suite of the winning playing piece and the number of consecutive bonus cards of the same suite delivered onto the following spaces 2, 3, 4 or 5 as follows:

1 bonus card—$5 payable from the jackpot.
2 consecutive bonus cards—$50 payable from the jackpot
3 consecutive bonus cards—$200 or $500 payable from the jackpot
4 consecutive bonus cards—10% of the jackpot pool
5 consecutive bonus cards—100% of the jackpot pool In this regard the bonus cards that are delivered must comprise the five bonus cards of the suite of cards relevant to the winning playing piece. Once a non-bonus card of the same suite or any card of another suite is dealt the magnitude of the jackpot is set.

The game apparatus according to the present invention provides a game which is representative of a horse race comprising four horses where each of the horses has an equal chance to win, come second, third or last place and bets may be placed upon the race according to a first past the post, trifecta or quinella. Players can place bets on the horse as they desire.

The game apparatus according to the preset invention renders itself to the form of a board game.

According to a second embodiment the card game may comprise a table game associated with electrical or lighting displays relevant for each of the stations and the track.

According to a third embodiment the card game may comprise a computer drive game which is played on a stand alone terminal or alternatively on-line though a network which can be a local network or through the Internet.

According to a further embodiment the playing cards of the first embodiment can be replaced by any other form of playing tokens desired and the number of subsets of tokens can be varied as desired.

In an alternative embodiment illustrated in FIGS. 3 to 7, a table game apparatus is provided in which a number of players can participate, a preferred form of which is illustrated in FIG. 3.

Figure 4:
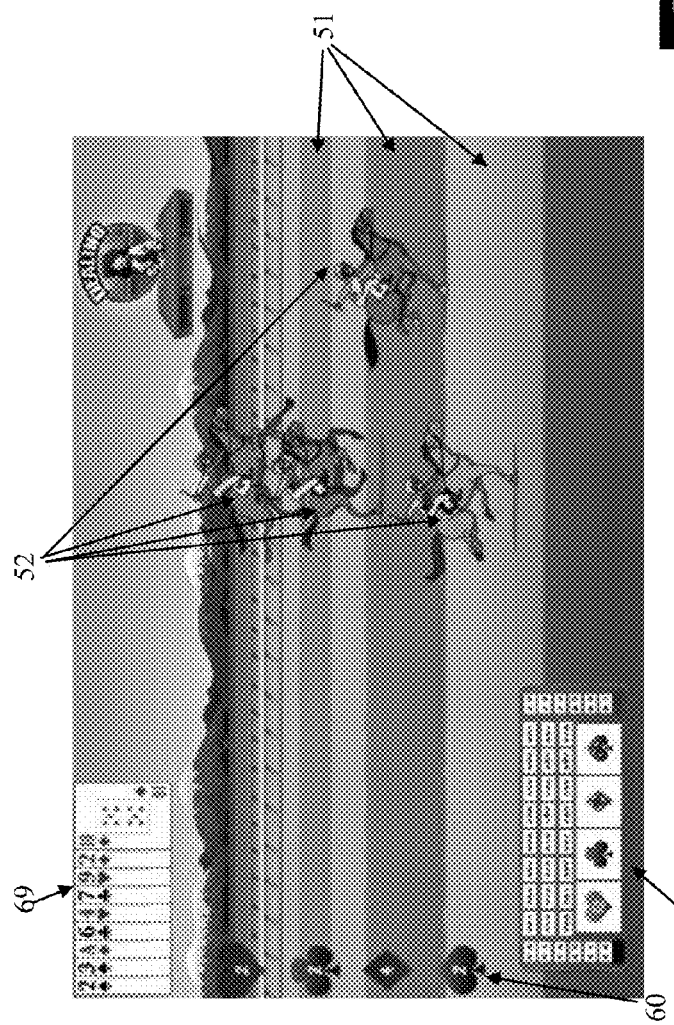
FIG. 4 is an illustration of a display device having an updatable electronic display according to the preferred embodiment illustrated in FIG. 3.

The table game includes a television 50 having an updateable electronic display 59 of a track comprising an image of a number of lanes 51; and an updateable image of a number of horses 52 which are in one to one correspondence with the number of lanes 51, each horse 52 being associated with one of the lanes 51 and being represented by an image displayed thereon, on the updateable electronic display. This configuration is best illustrated in FIG. 4. Not illustrated in FIG. 4 is that each lane is divided into an equal number of spaces extending from a start space to a finish space.

The table game also includes a table 53 having an upper playing surface 54. In addition to a number of player stations 55, the table has a set of stations marked thereon to representing an outcome of the passage of the horses 52 from the start space to the finish space on the track in accordance with drawing one or more cards from a set of playing cards as explained below. Each of the stations is associated with reward tokens which in use can be placed on one or more stations on the table by the players, with the stations also being representative of a fixed reward available in the event of the designated outcome of the station being achieved.

The table 53 also includes an electronic card reader 56 positioned relative to the table 53, adjacent the card shoe 57 from which the cards 62 are drawn.

The table game includes a set of playing cards divided into a number of suits which are in one to one correspondence with the number of horses 52 displayed on the updateable electronic display. The number of playing cards in each suit is equal.

In use, the playing cards are drawn sequentially from the card shoe 57 by a dealer 58, then read by the electronic card reader 56 such that the horse 52 associated with the suit 60 of each displayed playing card is moved sequentially along the track displayed on the updateable electronic display 59 together with an associated audible description of the movement of the horse 52 relative to the spaces in the lanes, the movement and audible description based on the identification of the playing cards 62 as they are read.

In this embodiment, the invention includes a television 50 with an integrated sound system capable of emitting sound and which is linked to a computer controller 61.

Generally, the track is provided and displayed as a simple image on the display device, of a field divided into four lanes as illustrated in FIG. 4. An image of a horse 52 is provided in each of the lanes on the display and the lanes and the horses 52 are designated according to one suit 60 of a deck of cards with the number of lanes generally corresponding to the number of suits of cards and one lane being ascribed to each of the suits of cards as illustrated in FIG. 4.

The display on the television 50 is updated upon instructions issued by a computer controller 61. As the display is updated, the image of the horse(s) 52 will be moved across the display in their respective lanes in order to simulate a horse race taking place depending upon which cards are drawn.

In the preferred embodiment, the television 50 is positioned remotely to the table at an elevated position on the dealer side of table 53, generally facing the table 53 such that the television 50 can be seen by all of the players at the table 53.

According to the preferred embodiment of the invention, there is a plurality of reward stations including any number of the following:

a. a set of "Winner" stations 63 on which players may place reward tokens to indicate their wager on the first playing piece to reach the finishing space (normally there will be four of these);

b. a set of "Quinella" stations 64 on which players may place reward tokens to indicate their wager on the first and second playing pieces to reach the finishing space, whether in order or not (normally there will be four groups of these); and c. a set of "Trifecta" stations 65 on which players may place reward tokens to indicate their wager on the first three playing pieces to reach the finishing space; whether in order or not (normally there will be 24 of these).

The process undertaken for determining second and third places remains similar to that outlined above, namely once the winner has been decided by one suit being displayed on a drawn playing card a predetermined number of times, the next card dealt from a suit which is different to the winning suit is declared the second place winner and the next card drawn from a suit which is different to both the winner and the second place winner is declared third.

According to the present embodiment, each station is individually lit, generally from below the table surface with the surface of the table being at least partially transparent or translucent in order to allow stations to be lit as required. It is difficult to illustrate this feature.

In the preferred embodiment, one or more lights are provided to light each station and the lights for each station are individually actuable and controlled by the computer controller 61. Normally, the lights are lit at the end of the game to indicate which stations identify successful combinations based on the cards dealt during the game. The lighting of the lights on the stations is controlled by the controller and based on the reading of the cards, without any dealer involvement.

As illustrated in FIG. 3, the card reader 56 will normally be positioned immediately adjacent the card shoe 57 from which the cards 62 are drawn sequentially during the game in order that the cards 62 can be passed over the card reader 56 upon exiting the shoe 57. The card reader 56 of this embodiment is electronic and linked to the computer controller 61 as illustrated schematically in FIG. 7. The computer controller 61 normally operates pattern recognition software in order to identify the suit of each card drawn.

Normally, the cards 62 are drawn from the shoe 57 facedown and passed over the card reader 56 at a speed to allow recognition of suit the card. Audible feedback (normally a short tone or sound) will normally be issued in order to indicate to the dealer and/or the players, that the reading of the card 62 and the identification of the card has been successful.

Normally, a transparent window 66 is provided in the table surface 54, typically of glass or plastic or the like and the card reader 56 is positioned beneath the table surface, below the transparent window, out of view.

Figure 6:
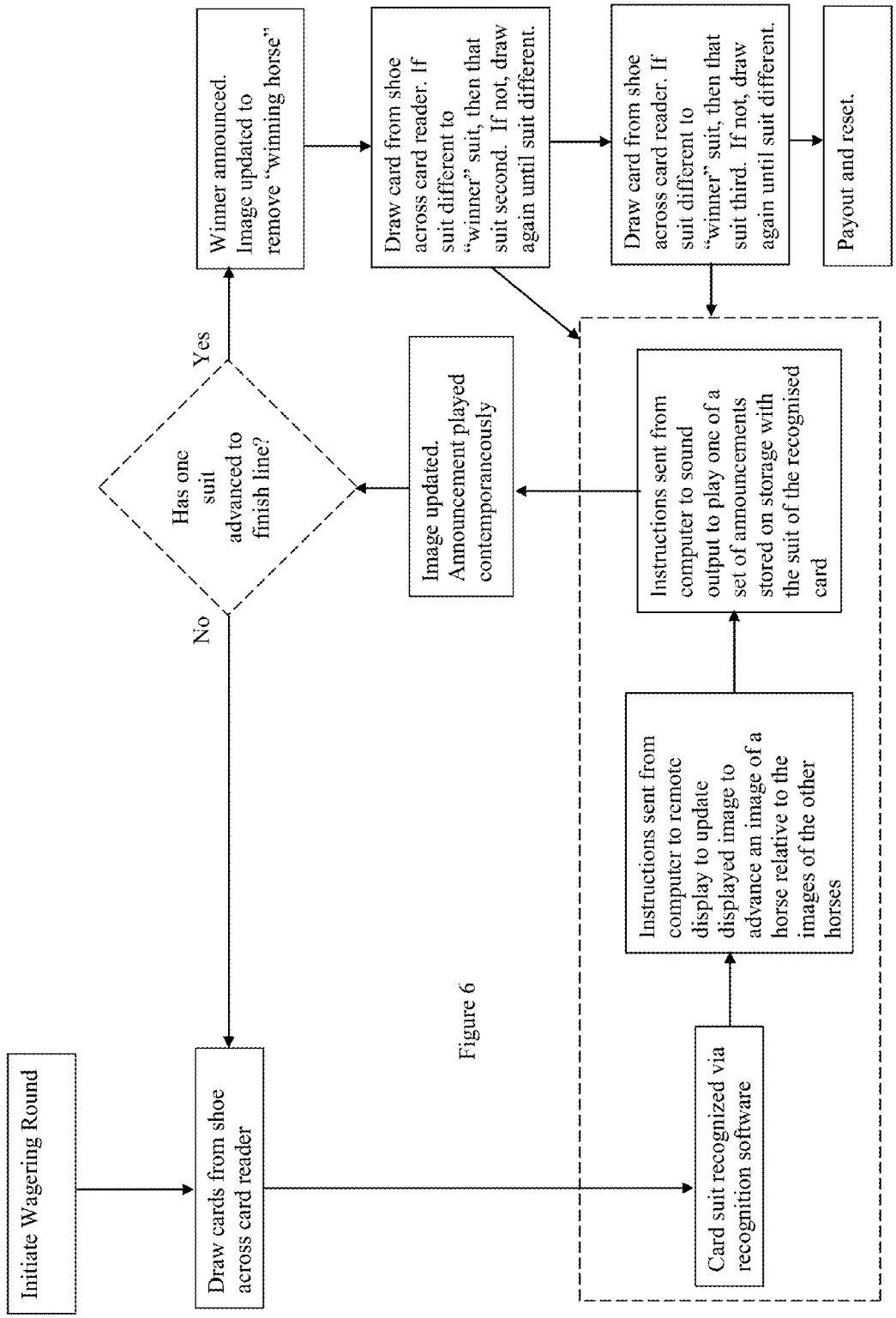
FIG. 6 is a flowchart illustrating a preferred operational process of the preferred embodiment illustrated in FIG. 3.
Figure 7:
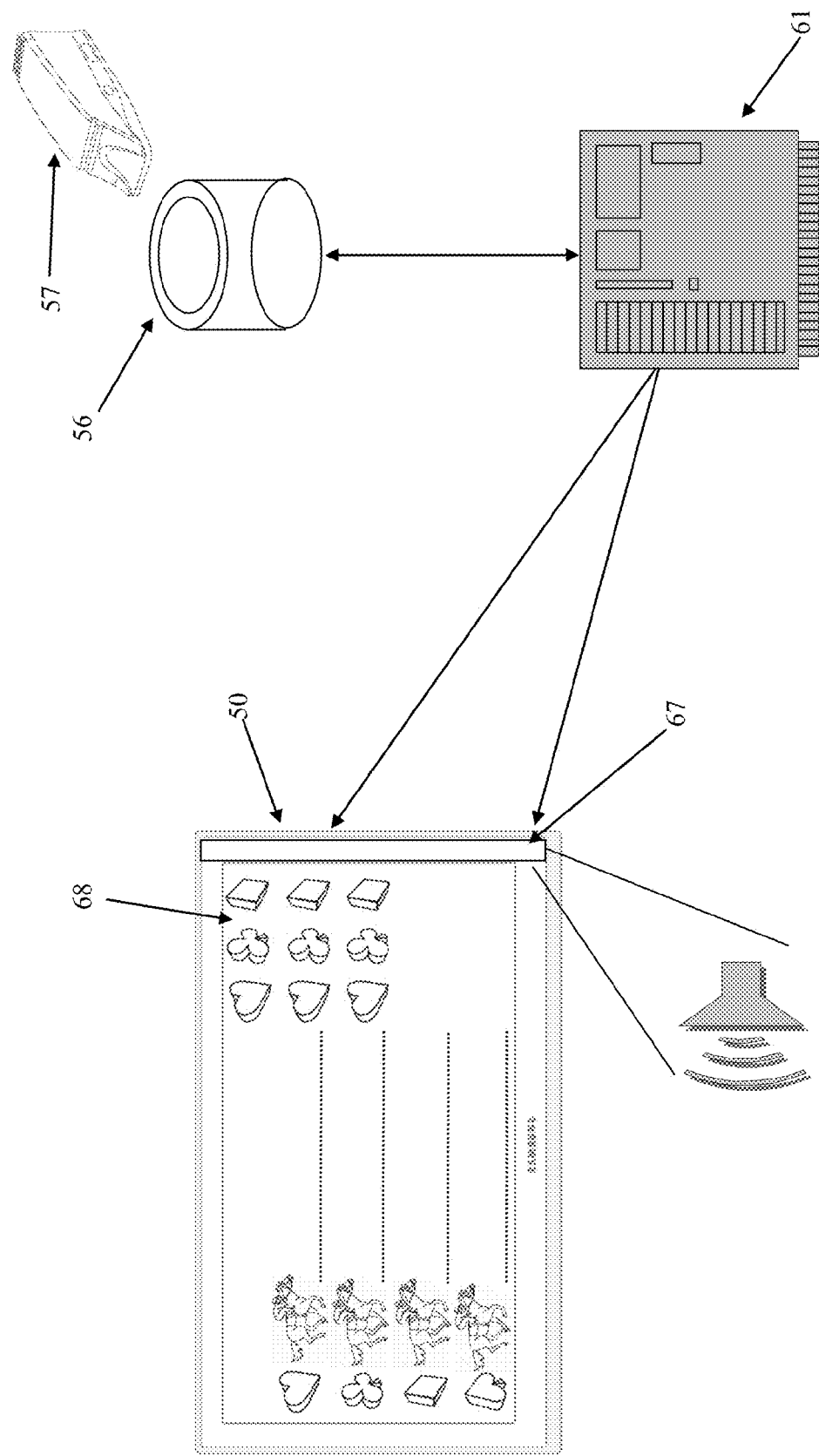
FIG. 7 is a schematic illustration of the preferred components of the embodiment illustrated in FIG. 3 with the physical table removed.

According to the preferred embodiment illustrated schematically in FIGS. 6 and 7, the computer controller 61 receives an image of each card 62 captured using the card reader 56 and then recognition software resident on the computer controller 61 processes the image in order to detect at least the suit of the card 62. Once this occurs, the controller 61 instructs the updating of the image on the display 59 to advance the particular horse 52 of the lane corresponding to the suit 60 of the drawn card by one space in the lane on the display 59. At the same time, the computer controller 61 extracts audio portion of a "race call" corresponding to that particular suit 60 from data storage associated with the computer controller 61 and transmits that audio portion to the sound system 67 so that the image update and the issue of the audible description of the update happens more or less contemporaneously. The audible description is normally broadcast at a sufficient level to allow the players of the game to hear the update as well as to see the horses 52 advance on the display, thereby creating interest and suspense in the outcome of the game.

The audible portions of the race call are normally stored in individual sound files in a data storage device associated with the computer controller 61. The audible portions are preferably chosen by the computer controller 61 according to relative positions of the "horses" 52 in the "race". This will typically be determined by the computer controller 61 according to the number of cards of each suit that have been drawn in a game.

As mentioned above, once a predetermined number of cards of one suit have been drawn, a winner of the race is identified and the computer controller 61 updates the image to remove that horse 52 from the display 59 and at the same time, announce the winning suit aurally. Thereafter, the next card of a suit which is different to the winning suit is placed in the associated position on the playing surface 54 after it has been read and that suit is declared second aurally with that horse 52 then being removed from the display 59. Thereafter, the next card of a suit which is different to the winning suit and the suit of the horse placing second is placed in the associated position on the playing surface 54 after has been read and that suit is declared third aurally with that horse 52 then being removed from the display 59.

Figure 5:
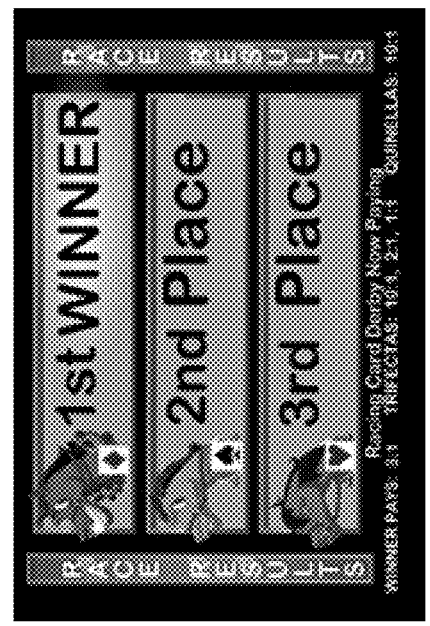
FIG. 5 is an illustration of an updatable electronic display in a second mode according to the preferred embodiment illustrated in FIG. 3.

Once third-place has been decided, the display 59 will typically be reset to identify the winner, the second place winner and the third place winner as illustrated in FIG. 5 and at the same time, the stations on the table indicating those particular successful wagers will be lit.

Normally, the odds or the payouts are included on the reset display showing the winner and second and third place winners as seen in FIG. 5. These results are stored. Historical race results 68 are indicated on a portion of the display 59 in subsequent races allowing the players to see a number of the historical results in order while a later game is being played. Normally, the historical results listing 68 are displayed to one lateral side of the track displayed.

The display 59 is also updated to include a simulated image 69 of each of the cards as they are drawn. This normally occurs at the same time as the image of the race is updated and as the audible description is issued. Therefore, the card reader 56 also recognises the particular card value as in the face value of the card, as well as the suit of the card for this purpose. However, the processing of the race typically occurs based on the suit of the card only.

The display will also preferably be updatable to show a simulated view 70 of the stations on the playing surface 54. The display may be updated throughout the game in order to indicate the particular state of the game at any point, as the cards 62 are drawn.

Once a result has been settled, in that the winner, second place winner and third-place winner have been identified, the dealer 58 will normally award payouts to successful wagers placed on each of the stations and collects unsuccessful wagers.

Once the successful wagers have been paid out and the unsuccessful wagers collected, the dealer 58 will reset the game so that it can be played again. As a part of the resetting process, the dealer will normally collect the drawn cards, remove the drawn cards from the shoe in order to shuffle all of the cards at which time they are then returned to the shoe. The dealer will also reset the display, the lighting of the stations by resetting the game controller to return the game apparatus to start position.

As will be seen from the above, the majority of the functions of the game are controlled by the computer controller 61 as illustrated schematically in FIG. 7. The dealer 68 will normally be required to draw cards from the shoe across the card reader so that they can be recognised and then place the cards in the required location on the table as well as paying out successful wagers and collecting unsuccessful wagers. The computer controller 61 will normally be located beneath the table 53 and preferably will be integrated with the table 53. The computer controller 61 is in communication with the card reader 56 in order to receive the image from the card reader 56 and process the image of each card 62 in order to recognise the card and transmit instructions to the television 50, retrieve and transmit the sound files and to update the display 59 and the table 53 when a result has been achieved.

Normally, the resetting of the computer controller 61 is achieved manually by dealer, normally using a button or switch 71 provided on or in the playing surface 54 for this purpose in the dealer area of the table 53 on the opposite side of the table to the electronic card reader 56.

The present invention is not to be limited in scope by any of the specific embodiments described herein. These embodiments are intended for the purpose of exemplification only. Functionally equivalent products, elements and methods are clearly within the scope of the invention as described herein.

The invention claimed is:

1. A table game apparatus in which a number of players can participate and comprising:
   a. a display device having an updateable electronic display of a track comprising an image of a number of lanes and an updateable image of a number of playing pieces which are in one to one correspondence with the number of lanes, each playing piece being associated with one of the lanes and being represented by an image displayed thereon on the updateable electronic display, each lane comprising an equal number of spaces extending from a start space to a finish space;
   b. a table including a playing surface identifying a set of stations marked thereon to representing an outcome of the passage of at least one of the playing pieces from the start space to the finish space on the track in accordance with drawing one or more cards from a set of playing cards, said stations associated with reward tokens which in use can be placed on one or more stations on the table by the players, said stations also being representative of a fixed reward available in the event of the designated outcome of the station being achieved;
   c. an electronic card reader positioned relative to the table, said card reader capturing an image of each playing card;
   d. a sound system associated with the table;
   e. a computer controller to receive the image of the cards captured by the electronic card reader, detect the suit of the card, update the image on said display, extract at least one audio portion of a race call corresponding to the suit of the playing card from a data storage associated with the computer controller and transmit the at least one audio portion to a sound system so that the updating of the image on said display and the issue of the at least one audio portion of a race call occurs contemporaneously, and;
   f. a set of playing cards divided into said number of subsets which are in one to one correspondence with the number of playing pieces displayed on the updateable electronic display, the number of playing cards in each subset being equal, each playing piece being associated with one of the subsets of playing cards,
   wherein in use said playing cards are drawn sequentially, then read by the electronic card reader such that the playing piece associated with the suit of each displayed playing card is moved sequentially along the track displayed on the updateable electronic display together with at least one audio portion, the movement and audible description based on the scanning of the playing cards.

2. A game apparatus according to claim 1 wherein the playing surface includes a number of stations around its perimeter representing the location of a player.

3. A game apparatus according to claim 1 wherein at least one playing card of the set of playing cards comprises a penalty card indicating a penalty to be applied to the rewards available at one or more station, against one or more of the players.

4. A game apparatus according to claim 1 wherein the reward tokens comprise items of currency.

5. A game apparatus according to claim 1 wherein the reward tokens comprise items representative of a monetary value of currency.

6. A game apparatus according to claim 1 wherein at least three sets of reward stations, are provided including:
   a. a set of "Winner" stations on which players may place reward tokens to indicate their wager on the first playing piece to reach the finishing space;
   b. a set of "Quinella" stations on which players may place reward tokens to indicate their wager on the first and second playing pieces to reach the finishing space, whether in order or not; and c. a set of "Trifecta" stations on which players may place reward tokens to indicate their wager on the first three playing pieces to reach the finishing space; whether in order or not.

\* \* \* \* \*